Dec. 16, 1952 A. C. THOMPSON 2,621,399
PROCESS FOR WELDING SEAMS IN THE MANUFACTURE
OF LIFT TYPE GAS HOLDERS
Filed April 3, 1947 2 SHEETS—SHEET 1

Inventor
ARTHUR C. THOMPSON.

By George D. Kennan
his Attorney

Dec. 16, 1952 A. C. THOMPSON 2,621,399
PROCESS FOR WELDING SEAMS IN THE MANUFACTURE
OF LIFT TYPE GAS HOLDERS
Filed April 3, 1947 2 SHEETS—SHEET 2

Inventor
ARTHUR C. THOMPSON.

By George *[signature]*
his
Attorney

Patented Dec. 16, 1952

2,621,399

UNITED STATES PATENT OFFICE 2,621,399

PROCESS FOR WELDING SEAMS IN THE MANUFACTURE OF LIFT-TYPE GAS HOLDERS

Arthur C. Thompson, Baltimore, Md., assignor to Koppers Company, Inc., Pittsburgh, Pa., a corporation of Delaware Application April 3, 1947, Serial No. 739,240

2 Claims. (Cl. 29—148.2)

This invention relates to new and improved methods of fabricating welded metal structures and is particularly directed to improvement in the manufacture of lift-type gas holders.

The invention has for its objects to provide new and improved methods of welding seams in closed vessels, the internal pressure of which is greater than atmospheric, which, while generally applicable to the welding of closed vessels in general, is particularly applicable to the welding of lift-type gas holders in which the lifts are assembled from prefabricated elements united one to another by incompletely sealed joints and in which said joints are welded progressively as the several lifts are raised by pumping gas into the holder; to provide new and improved methods of preventing leakage through unsealed seams and joints in welding operations as described; to provide methods and means for preventing leakage of air through seams and joints during welding as described; to provide for seams and joints as described temporary seals which are automatically eliminated during welding; to avoid disadvantages of the prior art and to obtain advantages as will be pointed out or as will become apparent. Other objects will appear as the description proceeds.

These objects are accomplished in the present invention of which the following is a complete description.

Lift-type gas holders are commonly used for the storage of gas in quantities in the order of up to 500,000 to 15,000,000 cubic feet. Such gas holders are constructed with one or more lifts whereby the volume of the gas holder may be increased or decreased as required to accommodate the supply of gas on hand. Such lift-type gas holders are constructed with a circular tank, not shown, adapted to hold water at least in the portion adjacent the periphery, a guide framed structure, not shown, and a gas-tight bell mounted for vertical movement by means of suitable rollers, not shown, adapted to roll on vertical guides. The bottom of the bell is sealed by the water in the tank, and the volume of the gas holder is determined by the position of the bell.

Figure 1:
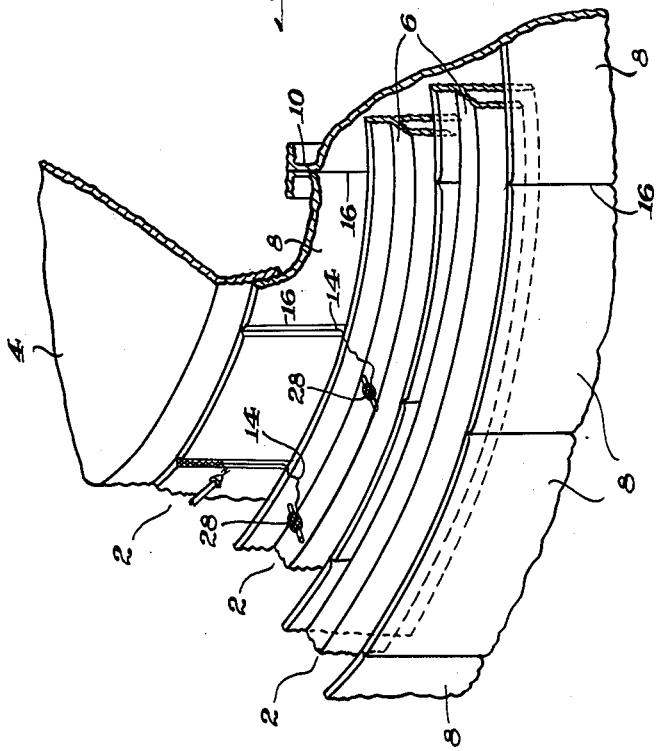
Figure 1 is a fragmentary isometric view illustrating a plurality of lifts of a lift-type gas holder and the manner in which the invention is applied thereto.

The bell in such lift type gas holders is usually constructed of two or more lifts 2 as shown in Figure 1 of the drawing. The innermost lift is provided with a cover 4 forming the top of the bell. When gas is pumped into the bell the innermost lift is raised as required to accommodate the volume of gas pumped in. As more and more gas is pumped in the inner lift continues to rise until an annular cup, not shown, on the bottom of the lift engages a grip 6 on the top of the adjacent lift. From then on both the innermost lift and the adjacent lift are raised as a unit, the grip 6 and the annular cup, not shown, forming an hydraulic seal to prevent escape of gas.

The present invention is particularly directed to new and improved methods of fabricating gas holders of the type described above and embodies novel features, as will now be described, which improve and facilitate the welding and otherwise accomplish the objects of the invention.

Figure 2:
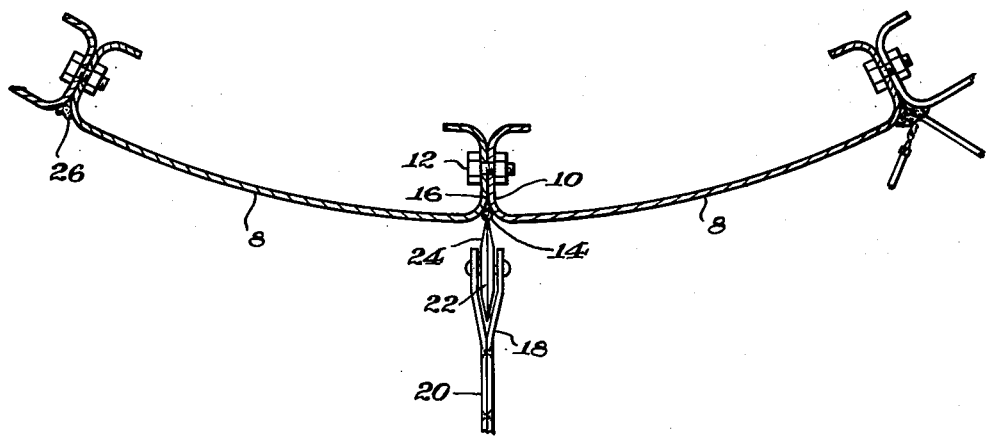
Figure 2 is a cross-section of one of the lifts of Figure 1 illustrating the application of the invention.
Figure 3:
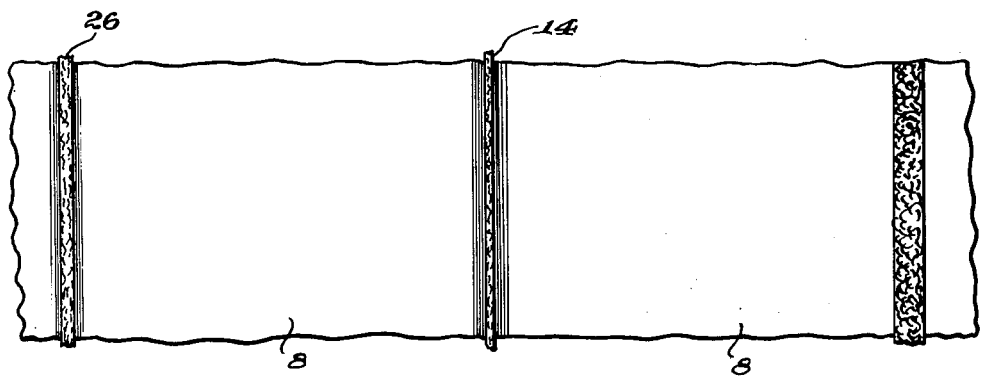
Figure 3 is an elevation of a fragment of the lift shown in Figure 2.

Referring now more particularly to Figure 2, it will be seen that the lifts are comprised of a plurality of vertical panels or prefabricated elements 8 which are formed generally in the shape of a channel with the upstanding slides 10 fastened together by suitable fastening means such as the bolts 12. The several lifts are fabricated in place by bolting together the prefabricated elements 8 and welding or otherwise securing thereto suitable cups and grips and on the innermost lift the cover 4.

When the lifts are thus assembled air may be introduced into the holder to lift the innermost lift to the position shown in Figure 1. If the joints between the prefabricated elements 8 are sufficiently tight as will normally be the case when sufficient bolts are used and the prefabricated elements are not damaged in transit or otherwise, the lift may be raised as shown without difficulty. Ordinarily, the pressure of 10 or 12 inches of water is all that is required for this purpose. When, however, the joints are not adequately tight the loss of air through the joint may make it difficult to raise the lift without excessive pump capacity. Moreover, the rush of air through the joints, irrespective of whether it is sufficient to interfere with lifting the lifts in the desired manner, interferes with the welding of the joints. These difficulties are avoided in the present invention by calking the joints with a non-flammable material before the joints are welded.

As best illustrated in Figure 2, a suitable calking material 14 is laid in the crack or crevice 16 between the joined walls 10 and forced into the crack or crevice by suitable tool 18, comprising a handle 20 and a roller 22 journaled therein. The roller 22 is tapered to a narrow edge as shown at 24 whereby the calking material 14 may be forced tightly into the crack or crevice 16, as shown more clearly at 26. It will be understood that the illustrations of the calking material shown at 14 and 26 are considerably exaggerated and that on the scale shown in Figure 2 the calking, especially after being forced into the crack or crevice 16 would scarcely be discernable.

The calking is most suitably effected by forcing a soft non-flammable yarn into the crack or crevice 16. Thus, as best shown in Figure 1, yarn from one or any suitable number of balls 28 is forced into the crack or crevice 16 as far down as convenient in view of the heights to which the lift has been elevated. Herein lies a further advantage of the invention in that by calking the cracks or crevices 16 as the left is raised, the lift may be raised to a higher elevation and consequently a greater length of the joint may be welded in a single operation.

The welding is effected in the usual manner; either starting at the top and welding down as shown in Figure 1, or by starting at the bottom and welding up. When the joints all around the lift are fully welded, the lift is raised again and the operation repeated until the entire bell structure has been welded.

While, in carrying out the processes of the invention, any suitable calking material which is non-flammable such as asbestos yarn or other mineral calking materials, it is of especial advantage to utilize a material which, while being non-flammable, is nevertheless combustible. By using a combustible, non-flammable calking material I am able adequately to seal the joints and to maintain them sealed during the welding and yet have the calking material burnt out progressively as the joints are welded. For this purpose I have found ordinary cotton rug yarn which has been flame-proofed by impregnation with a fire retardant material such as ammonium sulfamate, ammonium phosphate, borax and like well known flame retarders, to be particularly effective. If the yarn so treated when ignited will burn spontaneously without bursting into flame, it is adequately treated for the purpose of the invention. It, of course, may be so treated that it will not burn spontaneously. All that is required is that it be incapable of bursting into flame when ignited at ordinary temperatures in the ambient atmosphere. Such a material within the means and scope of this invention is non-flammable. Those skilled in the art of fire retardants will be able to provide suitable formulations for flame-proofing cotton rug yarn or other yarns suitable for use in the invention in accordance with the specification.

While I have disclosed my invention with reference to particular embodiments thereof, it will be understood that variation may be made without departing from the spirit and scope of the invention as described above and as set forth in the appended claims.

I claim:

1. In a process for constructing a metal vessel which comprises a series of panels which are bolted together and have outwardly opening crevices at the bolted-together joints through which air can escape when the internal air pressure in the vessel is greater than atmospheric pressure, the method of welding said joints while the internal air pressure is greater than atmospheric pressure which comprises forcing a combustible calking material into said outwardly opening crevices and then welding said calked joints, said calking material being impregnated with a fire retardant whereby it burns out slowly without substantial flame under the intense heat of the welding.

2. In a process for erecting lift-type gas holders the steps comprising constructing a bell comprising at least one lift by assembling the side by side relation a plurality of channel-shaped members and fastening the sides of each of said channel-shaped members to the adjacent sides of other of said channel-shaped members whereby to form the vertical walls of said lift, said fastening being effected by bolting the sides together whereby there is provided between adjacent webs of adjacent channel-shaped members an unsealed outwardly opening crevice, progressively raising said bell by pumping in air, forcing into said outwardly opening crevices a combustible calking material progressively as said crevices become exposed and then welding the calked joints, said calking material being impregnated with a fire retardant whereby it burns out slowly without substantial flame under the intense heat of the welding.

ARTHUR C. THOMPSON.

REFERENCES CITED

The following references are of record in the file of this patent:

UNITED STATES PATENTS

| Number | Name | Date |
|---|---|---|
| 300,005 | Patterson | June 10, 1884 |
| 368,508 | Bishop | Aug. 16, 1887 |
| 1,103,630 | Stewart | July 14, 1914 |
| 1,738,689 | Brown | Dec. 10, 1929 |
| 2,145,009 | Keir | Jan. 24, 1929 |
| 2,186,185 | Walker | Jan. 9, 1940 |
| 2,188,925 | Ronay | Feb. 6, 1940 |
| 2,263,021 | Uecker | Nov. 18, 1941 |
| 2,332,454 | Martin | Oct. 19, 1943 |
| 2,354,532 | Martin | July 25, 1944 |
| 2,360,222 | Gruening | Oct. 10, 1944 |
| 2,511,873 | Perkins | June 20, 1950 |

OTHER REFERENCES

Smooth-On Handbook, by Smooth-On Mfg. Co., 570-574 Cummunipaw Ave., Jersey City, N. J. 1924, p. 81.